Jan. 3, 1961 P. D. ZEMANY 2,967,239
METHOD AND APPARATUS FOR ANALYZING CONSTITUENTS OF A SUBSTANCE
Filed Feb. 19, 1954
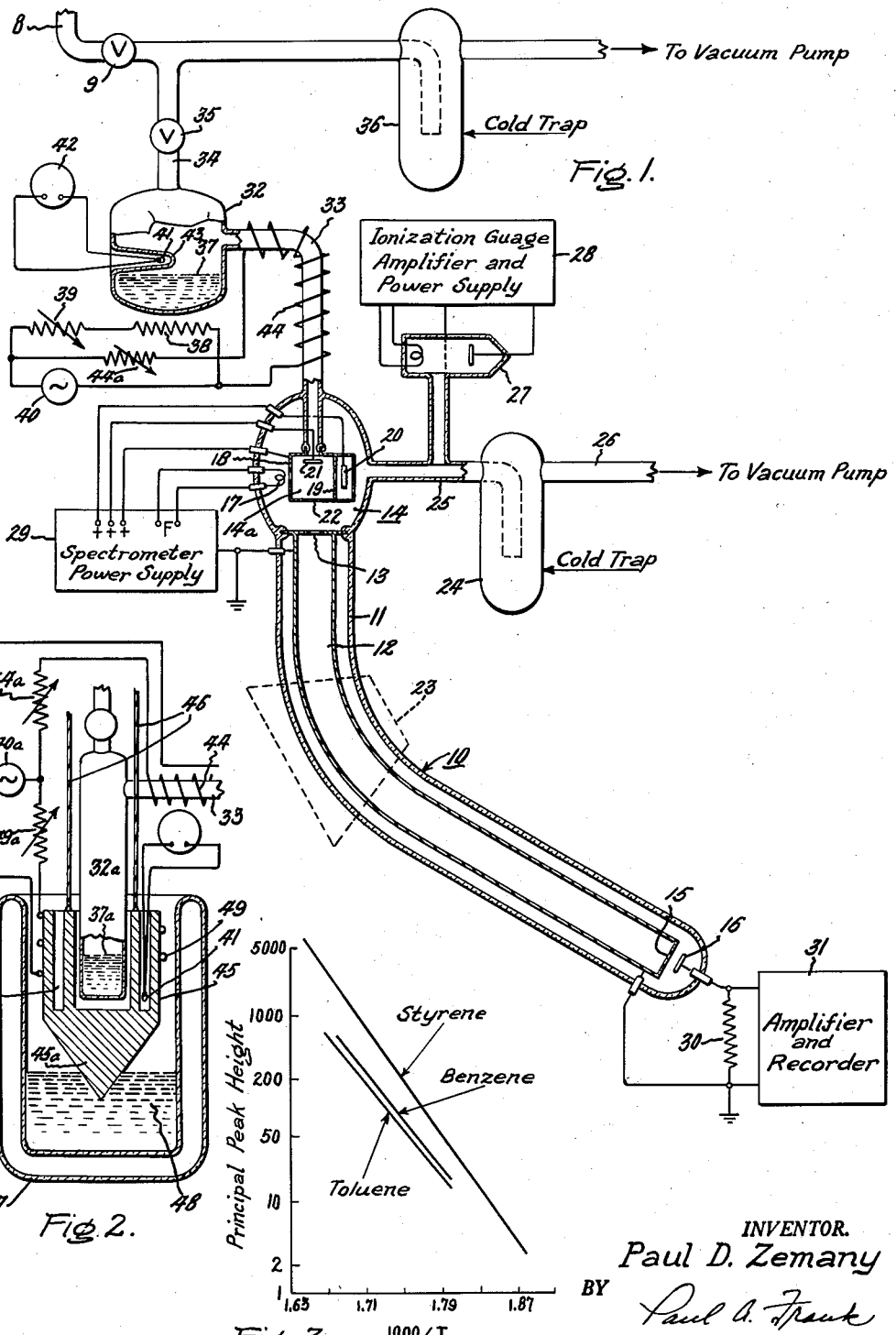
INVENTOR.
Paul D. Zemany
BY
His Attorney.

United States Patent Office 2,967,239
Patented Jan. 3, 1961

2,967,239

METHOD AND APPARATUS FOR ANALYZING CONSTITUENTS OF A SUBSTANCE

Paul D. Zemany, Schenectady, N.Y., assignor to General Electric Company, a corporation of New York Filed Feb. 19, 1954, Ser. No. 411,417

5 Claims. (Cl. 250—41.9)

My invention relates to ionic discharge devices such as mass spectrometers, and more particularly to methods and apparatus for utilizing an ionic discharge in the analysis of the constituents of a substance. The invention is especially directed toward methods and apparatus which utilize an ionic discharge to analyze the constituents of materials productive of gas and gaseous mixtures, and is concerned primarily with novel methods and apparatus for controlling the introduction of the specimen to be analyzed into the ionizing region of a mass spectrometer.

In conventional mass spectrometer apparatus for analyzing gaseous mixtures, the gas sample to be analyzed is normally introduced into the ionization chamber through an orifice, commonly called a "leak," small in diameter compared to the mean free path of the gas molecules in the remaining volume of the system. Because of this small diameter of the leak, the gas flow therethrough is determined almost entirely by the leak itself and is commonly "free molecular" such that each component of the mixture flowing into the ionization chamber exhibits a partial pressure or rate of flow therein which is independent of the pressure of any other component in the initial mixture applied to the other side of the leak. The leak must be critically dimensioned and the rate of evacuation must be carefully and accurately determined. Because of the differences in the rate of diffusion of heavier and lighter gases through the leak, further precautions and expedients are often necessary to insure that the gas mixture in the ionization chamber is representative of the mixture desired to be analyzed. The presence of a leak in the inlet system has generally been considered essential for accuracy of analysis regardless of the manner in which the gas sample to be analyzed was initially generated or transmitted to the inlet system of the mass spectrometer.

Accordingly, one important object of the invention is to provide a new method and apparatus, applicable to the analysis of many different substances, for introducing a gaseous sample to be analyzed into the ionization chamber of mass spectrometer apparatus which does not require the passage of the gas sample through a leak, thereby eliminating much of the complicated equipment and precautions required in apparatus utilizing a leak.

Another object of the invention is to provide a new method and apparatus for directly analyzing by use of a mass spectrometer the constituents of a large group of solid and liquid substances and compounds.

A further object of the invention is to provide a new method and apparatus for directly measuring the amount of gas constituents produced from a heated liquid or solid substance.

In general, in accord with my new method, a liquid or solid substance non-volatile at reduced pressures at one temperature but productive of, such as by emitting, evolving, vaporizing or decomposing into, a volatile gas or gases at other higher temperatures is placed within a chamber opening into the ionization chamber of a mass spectrometer and both chambers are evacuated. The sample is maintained at a temperature in which it has a liquid or solid state under evacuation until the analysis is to be made. Thereupon, the temperature of the substance is gradually elevated until gas is produced from the substance and the rate of production is controlled by the temperature. The partial pressure of each gas entering the ionization chamber is found to be virtually dependent only upon the rate of production of the gas as controlled by the temperature and the amount of material present. The temperature and rate of temperature increase is controlled such that the amount of gas entering the ionization chamber never raises the pressure within ionization chamber above a predetermined safe value where arcing occurs, for example $10^{-3}$ millimeters of mercury, or, for accuracy, no greater than $10^{-5}$ millimeters of mercury. If the rate of production should accidentally become too high, or if it should be desired to shorten the time involved in taking the analysis, any desired percentage of the gas produced in the sample chamber may be by-passed to the vacuum pump thereby not to increase the pressure in the ionization chamber above the safe value.

The apparatus of the invention comprises a sample chamber communicating freely with the ionization chamber of the mass spectrometer and means for adjustably regulating and monitoring the temperature of the sample chamber as well as the temperature of the conduit connecting the sample chamber to the ionization chamber. Means are also included for evacuating both the ionization chamber and sample chamber and for measuring the gas pressure within the ionization chamber. A by-pass valve system is preferably also connected between the sample chamber and the evacuating system in order to control the percentage of generated gas transmitted to the ionization chamber.

The novel features believed characteristic of the invention are set forth in the appended claims. The invention itself, however, together with further objects and advantages thereof, may be best understood by referring to the following description taken in connection with the accompanying drawing, in which Fig. 1 illustrates apparatus embodying the invention in connection with a sample to be analyzed which is non-volatile at reduced pressures at room temperature;

Fig. 2 illustrates a modification of the sample inlet system of the invention for use in analyzing a sample which is volatile at reduced pressures at room temperature, but non-volatile at a lower temperature, and Fig. 3 is a group of curves illustrating the results of a typical analysis possible with the method and apparatus of the invention.

Referring to Fig. 1, one embodiment of the invention is shown in conjunction with a conventional 60 degree mass spectrometer ionic discharge device 10 including an evacuable envelope 11 surrounding a beam confining tube 12 communicating through an entrance slit 13 with an ion source 14. Tube 12 has an exit slit 15 at its lower end facing the output target or anode 16 of the spectrometer apparatus. Ion source 14 includes an ionization chamber 14a and comprises an electron beam producing means including a filament 17, beam focusing and accelerating electrodes 18 and 19, and an anode 20. Ionization chamber 14a may be heated by any conventional means (not shown). An ion beam repelling electrode 21 may be located immediately above the electron stream flowing between filament 17 and anode 20 and repels the ionized beam through the first focusing and accelerating slit 22 in electrode 18 and through the entrance slit 13 of deflecting tube 12. The proper magnetic field for deflecting the ion beam is provided by suitable magnets whose pole faces are designated diagrammatically by dashed line 23. Ion source 14 and tube 12 are connected through conduits 25 and 26 to a suitable evacuating system including a cold trap 24. Apparatus for measuring the pressure within the vacuum system is provided in the form of an ionization gauge 27 opening into conduit 25 and associated circuitry 28. Suitable voltages for operating the ionizing system of the spectrometer apparatus 10 are provided by spectrometer power supply 29. The output voltage generated by the impingement of the ionized beam upon target anode 16 of apparatus 10 is developed across an output resistor 30 and suitably amplified and recorded by conventional circuitry designated as block 31.

In accord with the invention, an evacuable sample chamber 32 has a sealed gas conduit 33 communicating between ionization chamber 14a and the upper portion of sample chamber 32. The diameter of inlet conduit 33 is fairly large, of the order of a centimeter, as contrasted with conventional leak diameters, of the order of $10^{-4}$ centimeters, such that there is relatively little restriction of the flow of gas from sample chamber 32 into ionization chamber 14a. A by-pass fluid conduit 34 is connected through a fluid valve 35 between the top of sample chamber 32 and an evacuating system including cold trap 36.

In order adjustably to control and monitor the temperature of specimen 37 to be analyzed, I provide a resistance heating element 38 located adjacent the bottom of sample chamber 32 and connected in series with a variable resistance 39 and a source of electrical power 40. Any other temperature controllable heating system may alternatively be employed. In addition, I preferably also provide means for adjustably controlling the temperature of inlet conduit 33 shown in Fig. 1 as a resistance heating wire 44 coiled around conduit 33 and connected to power source 40 through a variable resistance 44a. Heating of tube 33 is necessary in some cases in order to prevent condensation of the gases upon the inner wall of the tube. A thermocouple 41 connected in series with a sensitive current measuring instrument 42 is located within a recess 43 within the outer wall of sample chamber 32 extending within or immediately above specimen 37 thereby to generate and measure a voltage proportional to the temperature of specimen 37.

In Fig. 1 the material or substance of specimen 37 within sample chamber 32 is one which is non-volatile at reduced pressures at room temperature, but which emits, evolves, vaporizes, or decomposes into one or more gases when elevated to temperatures above room temperature. Examples of substances which are non-volatile at room temperature but which emit or evolve gases at an elevated temperature are practically all metals, ceramics, glasses, polymers, and other non-volatile materials containing adsorbed or dissolved volatile materials. Examples of materials which are non-emissive at room temperature but which vaporize to emit gases at elevated temperatures are metals such as cadmium and indium, or salts such as sodium bromide. To utilize this method with vaporized materials, care must be taken that sample chamber 32, inlet tube 33, and ionization chamber 14a are sufficiently heated to prevent condensation of the vaporized material on the walls thereof. Materials which are relatively non-emissive of gases at room temperature but which decompose into various gaseous compounds at elevated temperatures are principally organic materials, for example polymers such as polystyrene, silicones, polyacrylates, alkyds, epoxides, polyvinyls, polyamides, and cellulostics.

Referring now to Fig. 2, I have illustrated apparatus embodying the invention for use in the analysis of a specimen 37a which has appreciable vapor pressure at room temperature or is gas emissive at reduced pressures at room temperature but which becomes non-productive of gases at lower temperatures. Examples of such substances are polymers which contain residual solvents and materials, such as mercury, having appreciable vapor pressure, i.e., above about $10^{-4}$ millimeters of mercury at room temperature. The invention is particularly adapted to those substances or gas mixtures which include or are composed of gaseous components having approximately the same vapor pressure such that it becomes difficult by ordinary methods, such as by distillation, to isolate these gaseous components. In the apparatus of Fig. 2, the sample chamber 32a is supported within a metal support member 45 having a thick conical bottom portion 45a of high thermal conductivity. Metal support member 45 is suspended by wires 46 within an insulated vessel 47. A coolant such as liquid nitrogen 48 is poured into vessel 47 around the conical bottom of metal member 45. Surrounding the upper portion of metal member 45 is an insulated heating element such as calrod unit 49. Calrod unit 49 is connected through a variable resistance 49a to power source 40a. Thermocouple 41 is located within an annular recess 50 extending axially from the top of member 45 down to its conical bottom portion 45a. The temperature of specimen 37a can be controlled over a range of temperatures of about 20° C. above the boiling point of the coolant employed by varying the amount of heat supplied to the thermally conductive metal cone 45 from calrod unit 49 and/or by simply raising or lowering the level of coolant 48 within vessel 47.

In the operation of the apparatus of Fig. 1, the specimen to be analyzed may be admitted into the sample chamber 32 while in a liquid or gaseous state through a fluid inlet conduit 8 and valve 9 provided for this purpose. It is preferred, however, to make an opening in the wall of sample chamber 32 large enough to admit the specimen and thereafter to seal this opening. After the specimen is admitted into sample chamber 32, inlet valve 9 and by-pass valve 35 are closed and sample chamber 32, ionization chamber 14a and deflection tube 12 evacuated by the evacuating system connected to ion source 14. The ionization chamber 14a is evacuated to a pressure less than $10^{-5}$ millimeters of mercury as measured by ionization gauge 27 and associated circuitry 28 or as may be measured by the general level of signals recorded by the output amplifier and recorder of the mass spectrometer apparatus. With the apparatus of Fig. 1, specimen 37 must be one that is relatively non-volatile at room temperature at such reduced pressures. The mass spectrometer power supply is then energized and the temperature of the specimen slowly elevated by varying resistance 39 to supply additional increments of heat to the specimen 37 through heating element 38. As the temperature of specimen 37 rises, it emits, evolves, vaporizes or decomposes into gases desired to be analyzed as the case may be. Such produced gases immediately flow without restriction through conduit 33 into the ionization chamber where they are analyzed by the mass spectrometer apparatus. The only precaution which must be observed is that the temperature be maintained at such a value or the rate of temperature rise of specimen 37 be slow enough that the pressure of the gases within ionization chamber 14a does not rise above a safe value for the instrument, usually a value no greater than $10^{-3}$ millimeters of mercury. The precaution is quite easy to maintain by merely observing the indication of the ionization gauge or the level of output signals in the amplifier and recorder of the mass spectrometer while the temperature of specimen 37 is being raised. If the temperature of specimen 37 should accidentally be raised at too rapid a rate, by-pass valve 35 is opened to an extent sufficient to reduce the pressure within ionization chamber 14a back to its desired level.

If it is desired to analyze a gas which is emitted from specimen 37 at a fairly high temperature at which the rate of production of gases from specimen 37 is in excess of that which may accurately be analyzed by the mass spectrometer apparatus 10, the specimen 37 is merely raised to such elevated temperature and the by-pass valve 35 opened to an extent sufficient to reduce the amount of gases admitted into ionization chamber 14a to the reduced pressure level required for proper accuracy of analysis; the relative speeds of vacuum pumping by the alternate routes having been determined.

The operation of the apparatus of Fig. 2 when substituted for the sample inlet system of Fig. 1 is substantially identical to that described above with the exception that specimen 37a is initially maintained at a temperature lower than room temperature and is thereafter gradually elevated. The specimen 37a may be admitted into sample chamber 32a of Fig. 2 while in a liquid or gaseous state and is maintained or condensed into a liquid or solid state in the bottom section of the sample chamber 32a by the temperature lowering effect of the liquid nitrogen or other coolant 48 surrounding the heat conducting member 45. After the mass spectrometer apparatus has been properly evacuated, the temperature of specimen 37a is slowly elevated from its initial low temperature by the variation of resistance 49a thereby to apply heat to the heat conducting member 45 through calrod unit 49. Alternatively, the temperature is merely allowed to elevate as a result of the evaporation and consequent lowering of the level of coolant 48 within vessel 47.

One example of the striking utility of my novel apparatus and method is found in the analysis of polymers. In one case, twenty-five milligrams of thermally polymerized styrene was deposited as a film over 150 centimeters squared of the interior of sample chamber 32 by evaporation of the benzene solvent. The polystyrene specimen was then given a preliminary degassing to remove the solvent by evacuating the sample chamber 32 while heating at 80° C. for four hours and at 30° C. for about twelve hours. The spectrometer was then turned on and the temperature of the sample was increased at a rate such that the pressure in the spectrometer tube did not exceed $1 \times 10^{-6}$ millimeters of mercury.

At the end of five hours the sample was at 110°, and benzene, methylcyclohexane, toluene, ethyl benzene and acetic acid comprised 95 percent of the material evaporating from the sample. Within nine hours a temperature of 145° was reached, and acetic acid predominated in the volatilized materials. After sixteen hours at 145°, the rate of production of volatile materials dropped, permitting the sample to be heated to 210° before large amounts of acetic acid limited the rate of heating. A temperature of 220° was reached in three additional hours. Small amounts of styrene were then observed, along with other materials, the acetic acid having decreased. The temperature was increased by small steps which brought out more acetic acid, and at the beginning of the next three or four increments, benzene and toluene were also produced. A temperature of 310° was finally reached. At this temperature the polymer was decomposing, chiefly to styrene, benzene and toluene, but the rates of evolution decreased with time at any one temperature. The sample was then left at 230° for about seventy hours; at the end of this period there was no measurable evolution of gas. All the results noted up to this point were ascribed to adsorbed or dissolved impurities, or odd configurations present in small amounts. The total amount of material volatilized is estimated as less than 1 percent of the sample.

Subsequent heating of the sample from 230° to the temperature range 260°–330° C. at intervals extending over a period of ten days showed the rates of evolution of styrene, benzene and toluene to be functions of temperature only. This is believed to be decomposition of the polymer. A plot of principal peak heights for these three materials against the reciprocal of the temperature is shown in Fig. 3.

The rate of production of styrene may be calculated by establishing the output signal height from the mass spectrometer for a given rate of flow. This was determined and it was found that a rate of $1.0 \times 10^{-4}$ µlit./sec. gave a peak height of 960 units. Hence, from Fig. 3 it will be seen that at 330° $7.0 \times 10^{-3}$ percent of the sample decomposes per minute to styrene. In like manner the rates of decomposition for any constituent of the sample at any temperature can be determined and integration of the rates versus time will give the total amount of each constituent of the sample analyzed.

What I claim as new and desire to secure by Letters Patent of the United States is:

1. Mass spectrometer apparatus comprising an ionization chamber, a sample chamber for containing a specimen relatively non-productive of gases at one temperature but productive of gases at higher temperature, said sample chamber being separate from said ionization chamber and connected for unrestricted gas flow thereto, evacuating means for reducing the pressure of gases within said ionization chamber to less than $10^{-5}$ millimeters of mercury, by-pass means for adjustably controlling the percentage of gases generated within said sample chamber transmitted to said ionization chamber, means for adjustably controlling the temperature of a specimen within said sample chamber to control the rate of production of gases therefrom, and means including said temperature control means and said by-pass means for limiting the pressure of gases admitted into said ionization chamber from said sample chamber to a value no greater than $10^{-5}$ millimeters of mercury.

2. Mass spectrometer apparatus comprising an ionization chamber, a sample chamber containing a specimen relatively non-productive of gases at one temperature but productive of gases at higher temperatures, said sample chamber being separate from said ionization chamber and connected for unrestricted gas flow thereto, means for measuring the pressure of gases within said ionization chamber, evacuating means for reducing the pressure of gases within said ionization chamber to considerably less than $10^{-5}$ millimeters of mercury, separate control means for adjustably controlling the percentage of gases generated within said sample chamber transmitted to said ionization chamber and means for adjustably controlling the temperature of a specimen within said sample chamber to control the rate of production of gases therefrom to a value providing a pressure within said ionization chamber not exceeding about $10^{-5}$ millimeters of mercury.

3. Mass spectrometer apparatus comprising an ionization chamber, a sample chamber separate from said ionization chamber for containing a specimen relatively non-productive of gases at one temperature but productive of gases at higher temperatures, a fluid conduit dimensioned to provide substantially unrestricted flow of gases connected between said sample chamber and said ionization chamber, means for evacuating said ionization chamber, means for adjustably controlling the temperature of a specimen within said sample chamber to control the rate of production of gases therefrom, and a fluid conduit opening into said sample chamber for connection to an evacuating system and including a valve for controlling the percentage of gas produced within said sample chamber that is transmitted from said sample chamber to said ionization chamber.

4. The mass spectrometer apparatus of claim 3 comprising means for controlling the temperature of the fluid conduit connected between the sample chamber and the ionization chamber.

5. A gas input system for mass spectrometer apparatus comprising a sample chamber having an output gas conduit for connection to the ionization chamber of the mass spectrometer, said conduit being dimensioned for relatively unrestricted gas flow therein, means for supporting a coolant in good heat transfer relation with said sample chamber to reduce the temperature of a specimen within said sample chamber considerably below room temperature, means for supplying heat to said sample chamber, and means for adjustably controlling the temperature of the heat supplied to said sample chamber to control the production of gases from a specimen within said sample chamber.

References Cited in the file of this patent

UNITED STATES PATENTS

| | | |
|---|---|---|
| 2,221,467 | Bleakney | Nov. 12, 1940 |
| 2,374,205 | Hoskins | Apr. 24, 1945 |
| 2,507,653 | Smith | May 16, 1950 |
| 2,621,296 | Thompson | Dec. 9, 1952 |
| 2,624,845 | Thompson | Jan. 6, 1953 |
| 2,699,505 | Usher et al. | Jan. 11, 1955 |
| 2,882,408 | Lofgren | Apr. 14, 1959 |

OTHER REFERENCES

"Enriching Stable Isotopes Electromagnetically," by C. P. Keim; Journal of Applied Physics, vol. 24, No. 10, October 1953, pages 1255–1261.